United States Patent [19]
Kadambi et al.

[11] Patent Number: 5,388,398
[45] Date of Patent: Feb. 14, 1995

[54] RECUPERATOR FOR GAS TURBINE ENGINE

[75] Inventors: Vedanth Kadambi, Monroe, Conn.; Constantin Sobaru, Allentown, Pa.

[73] Assignee: Avco Corporation, Providence, R.I.

[21] Appl. No.: 72,818

[22] Filed: Jun. 7, 1993

[51] Int. Cl.6 .............................................. F02C 7/10
[52] U.S. Cl. ................................... 60/39.511; 165/174
[58] Field of Search ...................... 60/39.511; 165/174

[56] References Cited

U.S. PATENT DOCUMENTS

| | | | |
|---|---|---|---|
| 1,853,189 | 4/1932 | Bancel . | |
| 2,852,042 | 9/1958 | Lynn . | |
| 4,106,558 | 8/1978 | Neveux | 165/109 |
| 4,301,649 | 11/1981 | Walker | 60/39 |
| 4,303,124 | 12/1981 | Hessari | 165/174 |
| 4,474,000 | 10/1984 | Benson et al. | 60/39 |
| 4,573,526 | 3/1986 | Jung | 165/134 |
| 4,607,689 | 8/1986 | Mochida et al. | 165/110 |
| 4,727,907 | 3/1988 | Duncan | 138/38 |
| 4,881,596 | 11/1989 | Bergmann et al. | 165/174 |
| 4,971,768 | 11/1990 | Ealba et al. | 422/176 |
| 4,993,223 | 2/1991 | Kretzinger | 60/39.511 |
| 5,004,044 | 4/1991 | Horgan et al. | 165/145 |

OTHER PUBLICATIONS

London, A. L. et al., "Oblique Flow Headers for Heat Exchangers", Transactions of the ASME, Journal of Engineering for Power, Jul., 1968, pp. 271-284.

Perlmutter, Morris, "Inlet and Exit-Header Shapes for Uniform Flow Through a Resistance Parallel to the Main Stream", Transactions of the ASME, Journal of Basic Engineering, Sep., 1961, pp. 361-368.

*Primary Examiner*—Richard A. Bertsch
*Assistant Examiner*—William Wicker
*Attorney, Agent, or Firm*—Perman & Green

[57] ABSTRACT

A system for preheating air before it enters the combustion chamber of a gas turbine engine includes a recuperator which extends between, and is supported by, forward and rear headers. Cold air to be pre-heated by the recuperator flows through an entry passage in the forward header, then into and through a first conduit of the recuperator which extends the length of the recuperator. The air then flows through a plurality of cross conduits located at different locations along the length of the recuperator where it becomes heated. Flow of the now-heated air continues into a second conduit in which it is guided toward the combustion chamber. Sleeves are provided, respectively, in the entry passage of the forward header and in the first conduit of the recuperator for maintaining substantially constant the pressure differential between the first and second conduits at all locations along the length of the recuperator.

6 Claims, 3 Drawing Sheets

HOT AIR →
COLD AIR --→
EXHAUST GAS ••••▶

RECUPERATOR FOR GAS TURBINE ENGINE

BACKGROUND OF THE INVENTION

1. Field of the Invention

The present invention relates generally to recuperators for gas turbine engines and, more particularly, to a technique for maintaining substantially constant the pressure differential between inlet and outlet conduits which extend through a recuperator.

2. Discussion of the Prior Art

Brayton cycle engines generally comprise means, specifically, compressors, for compressing air for the support of combustion, a combustion chamber which has inlets for both the compressed air and fuel, and means for extracting energy from the hot exhaust gases to produce mechanical work. When a turbine is used to extract energy, the hot exhaust gases produced in the combustion chamber are fed to a turbine that rotates a driveshaft. In a recuperated turbine engine, exhaust gases of the turbine are passed through a recuperative heat exchanger that heats the relatively cold compressed air from the compressor to maximize the efficiency of the engine. The purpose of the recuperator, or regenerator as it is sometimes called when it is of a rotating construction, is to return some of the heat energy that would normally be lost with the exhaust, to the front of the combustion chamber. By doing this, less fuel needs to be added to reach the turbine limiting temperatures and this will result in high thermal efficiency, low specific fuel consumption, and low exhaust gas temperature. Recuperators are commonly used on ground-power engines, but to a lesser extent on aircraft engines since this method of power recovery often results in excessive weight and/or air-sealing difficulties.

Typical of current recuperator designs is the construction disclosed in U.S. Pat. No. 5,004,044 to Horgan et al. In that instance, an annular heat exchange apparatus is provided for radially conducting a first fluid from a center aperture to an outer perimeter and is adapted for conducting a second fluid through the apparatus. The apparatus comprises a plurality of heat exchange modules and a plurality of second fluid conduit members. The heat exchange modules each have a rectilinear heat exchange means with a first fluid inlet side at the center aperture. The first fluid inlet sides substantially define the center aperture. The plurality of second fluid conduit members are located between adjacent modules for conducting the second fluid into the modules.

Another typical construction is that disclosed in U.S. Pat. No. 4,474,000 to Benson et al which proposes unique seals as a solution to the problem of leakage between the hot exhaust and cold high pressure air sides of the heat exchanger or recuperator.

Also known to the prior art are a variety of constructions for controlling the flow of air through a heat exchanger. These include U.S. Pat. Nos. 4,971,768 to Ealba et al; 4,881,596 to Bergmann et al; 4,727,907 to Duncan; and 4,573,526 to Jung.

Customarily, in the design of gas turbine engines, it is desirable for the air flow velocity to be minimized as it exits the compressor and, in this manner, minimize pressure losses, for example, frictional losses, turning losses, and the like. However, it has more recently come to be realized that this approach often results in a penalty in terms of reduced recuperator performance and, possibly, even increased pressure losses. In a highly successful modern gas turbine engine, for example, the air flow into the recuperator plates is typically non-uniform such that the plate pairs located near the front header receive more air than those located close to the rear header. This maldistribution results in increased metal temperatures, and increased pressure drop, perhaps 10%–15%, above theoretical, and a reduced effectiveness, about 2%–3%.

SUMMARY OF THE INVENTION

It was for the purpose of correcting this problem of maldistribution of air flow through the recuperator of a gas turbine engine and in light of the prior art as discussed above, that the present invention was conceived and has now been reduced to practice. The present invention, then, relates to a system for preheating air before it enters the combustion chamber of a gas turbine engine and includes a recuperator which extends between, and is supported by, forward and rear headers. Cold air to be pre-heated by the recuperator flows through an entry passage in the forward header, then into and through a first conduit of the recuperator which extends the length of the recuperator. The air then flows through a plurality of cross conduits located at different locations along the length of the recuperator where it becomes heated. Flow of the now-heated air continues into a second conduit in which it is guided toward the combustion chamber. Sleeves are provided, respectively, in the entry passage of the forward header and in the first conduit of the recuperator for maintaining substantially constant the pressure differential between the first and second conduits at all locations along the length of the recuperator.

The purpose of the proposed air inlet header and manifold sleeves is to reduce the maldistribution of air flow and insure a uniform flow from the front to the rear of the recuperator. This construction serves to improve the effectiveness of the recuperator, reduces the pressure drop in the region aft of the compressor, as well as to extend recuperator life. In effect, the function performed by the sleeves is to reduce the flow area in the air inlet conduits which results in its increased velocity and lowered pressure in a manner to assure that the pressure difference between the air inlet conduits and the air outlet conduits remains constant all along the length of the recuperator. Thus, the invention serves to correct the mis-match between the inlet and outlet conduits of the recuperator.

A primary object of the invention is to modify an existing gas turbine engine in such a manner as to maintain a substantially constant pressure differential between inlet and outlet air conduits which extend through a recuperator therein.

Another object of the invention is to provide a kit which enables the modification, with relative ease, of the inlet conduits of the recuperator for a gas turbine engine so as to assure a substantially constant pressure differential between inlet and outlet conduits extending through the recuperator.

A further object of the invention is to reduce the flow area of the inlet conduit extending through the recuperator of a gas turbine engine so as to maintain, throughout the recuperator, the ratio of the cross sectional area of the inlet conduits with that of the exit conduits at a pre-specified value.

Other and further features, advantages, and benefits of the invention will become apparent in the following description taken in conjunction with the following.

drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENT

Some gas turbine engines incorporate a heat exchanger called a regenerator or recuperator. The latter term will be used throughout this specification. The purpose of the recuperator is to return to the front of the combustion chamber some of the heat energy that would normally be lost with the exhaust gases. By doing this, less fuel needs to be added to reach the turbine limiting temperatures and this will result in high thermal efficiency, low specific fuel consumption, and low exhaust gas temperature. Although regeneration has been used on a number of ground based engines, it is not customary to use this method of power recovery in aircraft engines because of excessive weight and air sealing difficulties. The present invention was originally devised for the AGT 1500 gas turbine engine manufactured by Textron Lycoming as the power plant for the M1A1 main battle tank used by the US Army Turn now to the drawings and, initially, to FIG. 1 which is a diagrammatic cross section view of a portion of a gas turbine engine 20 such as the AGT 1500 and utilizing a recuperator 22. Throughout this disclosure, reference to the AGT 1500 engine is for the purpose of description only and is not to be considered as limiting the invention.

Figure 1:
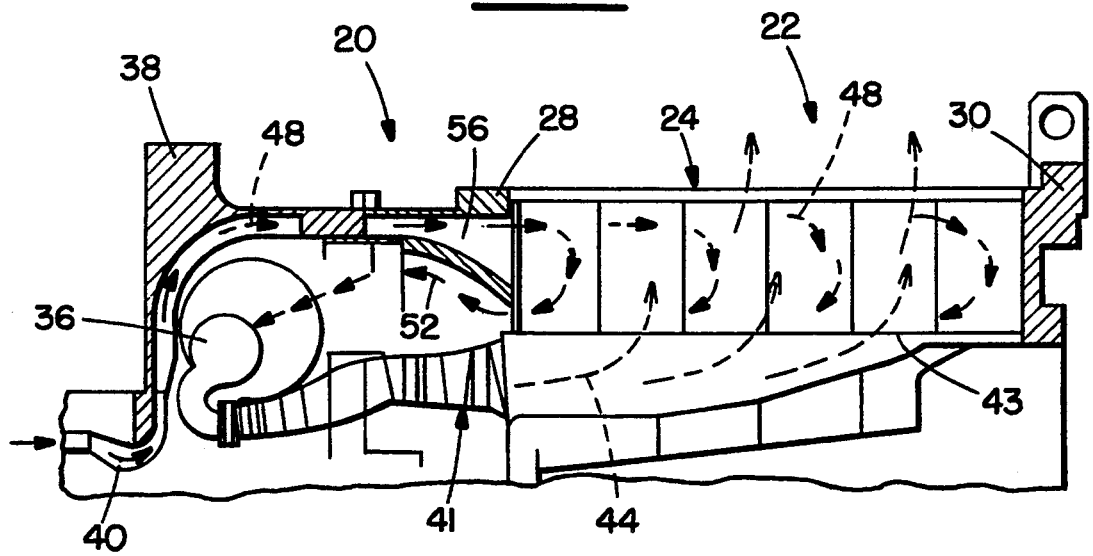
FIG. 1 is a side elevation diagrammatic view illustrating part of a gas turbine engine of the type embodying the present invention.
Figure 3:
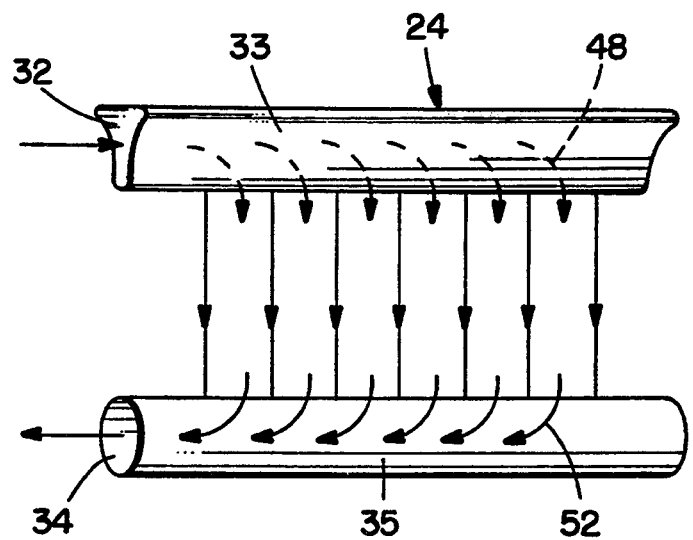
FIG. 3 is a diagrammatic view, descriptive of the operation of a recuperator for a gas turbine engine.
Figure 2:
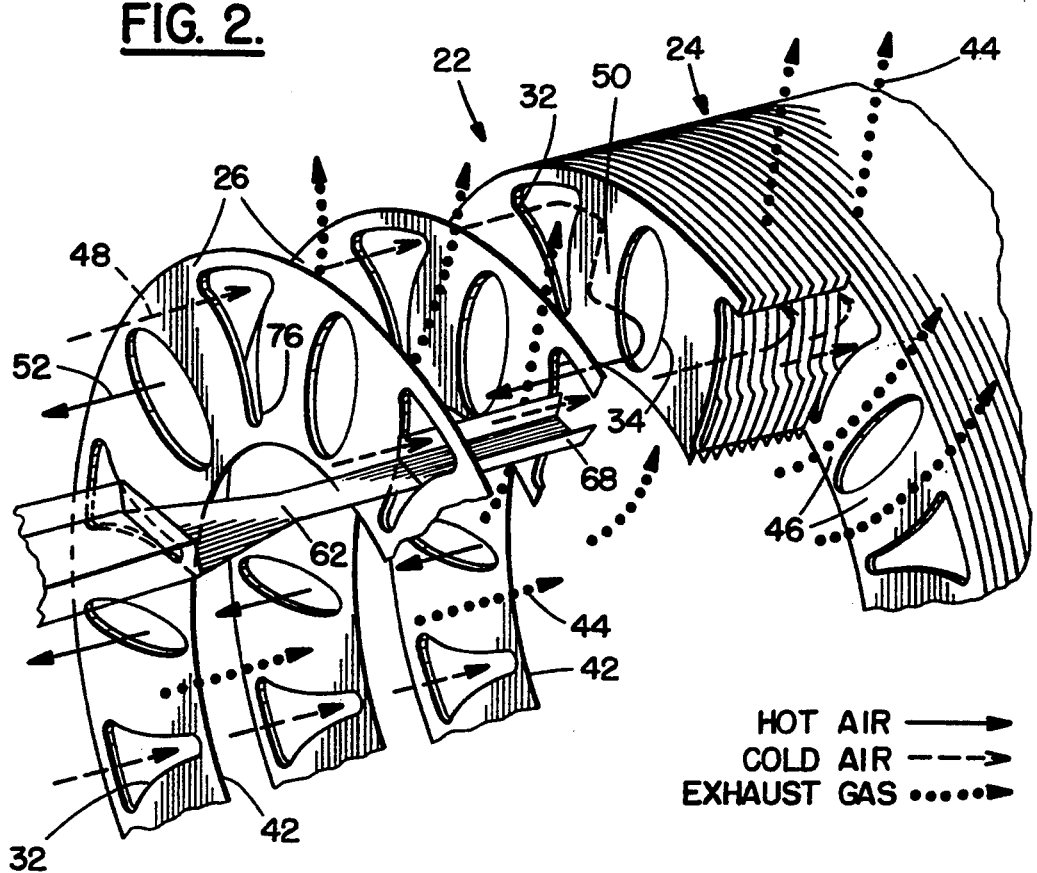
FIG. 2 is a detailed perspective view, partly exploded, and illustrating a part of the recuperator in the gas turbine engine depicted in FIG. 1 which incorporates one embodiment of the invention.

Viewing especially FIGS. 1 and 2, the recuperator 22 comprises a manifold assembly 24 of 275 pairs of annular plates or disks 26 in side-by-side spaced relationship supported between a forward header 28 and a rear header 30. The annular disks 26 have a plurality of circumferentially spaced inlet openings 32, the inlet openings of each successive annular disk being aligned to define an inlet manifold 33 (FIG. 3). The inlet openings 32 are depicted as being generally triangularly shaped although they may be of any suitable shape. In similar fashion, the annular disks 26 are also formed with a plurality of circumferentially spaced outlet openings 34 generally intermediate the inlet openings 32. The outlet openings are depicted as being elliptical in shape although, as with the inlet openings 32, they may be of any suitable shape. Also, as with the inlet openings 32, the outlet openings 34 in successive annular disks 26 are aligned and generally in communication with one another to define an outlet manifold 35 (FIG. 3).

As seen in FIG. 1, the recuperator 22 is positioned aft (to the right) of the power turbine 41. A casing 38 for the engine supports a plurality of conduits 40 for delivering pressurized air from the compressor (not shown), around the combustion chamber 36 and through the openings 32 in the forward header 28 to the manifold assembly 24.

Each of the annular disks 26 is formed with a central substantially circular opening 42 and the central openings 42 of each of the successive disks 26 define an exhaust passage 43 (FIG. 1) for receiving and transmitting the exhaust gases from the turbine 41 to the atmosphere. The annular disks 26 are so formed and joined together, in known manner, that the exhaust gases, indicated by arrows 44 travel along the passageway defined by the central openings 42 of the successive annular disks 26, then travel radially outwardly through radial passages 46 (FIG. 2) formed between adjoining disks 26. In a similar manner, pressurized intake, or cold, air represented by arrows 48 is caused to flow from the conduits 40, through the forward header 28, through the passage defined by the inlet openings 32, that is, the inlet manifold 33, then through cross passages 50 formed between each of the annular disks 26 connecting the inlet openings 32 with the outlet openings 34, then flowing through the passage defined by the outlet openings 34, that is, the outlet manifold 35, and to the combustion chamber 36 as represented by arrows 52.

By reason of the operation just described, it will be appreciated that the exhaust gases represented by the arrows 44 serve to heat the many disks 26 of the manifold assembly 24. The heat from the exhaust gases is thereby transferred by convection to the cold air flowing through the inlet manifold 33 while passing between the plates and through the outlet manifold 35. With the exhaust gases having temperatures in the range of 950° F. to 1300° F., heated air in the temperature range of 600° F. to 1050° F. is thereby provided to the combustion chamber 36.

In the instance of the AGT 1500 gas turbine engine, the inlet openings 32, which are generally triangular in shape, have an area of approximately 3.96 in$^2$ each and the outlet openings 34 which are generally elliptical in shape have an area of approximately 4.4 in$^2$. The air flowing through each opening 32, approximately 1.05 lbm/sec. at 1500 hp, divides itself among the 275 plate pairs, depending upon the pressure variations in the inlet and outlet manifolds defined by the openings 32, 34, respectively, and the difference in axial pressure between the two manifolds at any location. Since all the plate pairs are similar and offer equal resistance to flow, it is clear that a uniform flow (0.364% of the Total) through each plate pair requires that the pressure difference, $\Delta P = P_i - P_e$, be constant at all axial locations along the recuperator 22.

Figure 4:
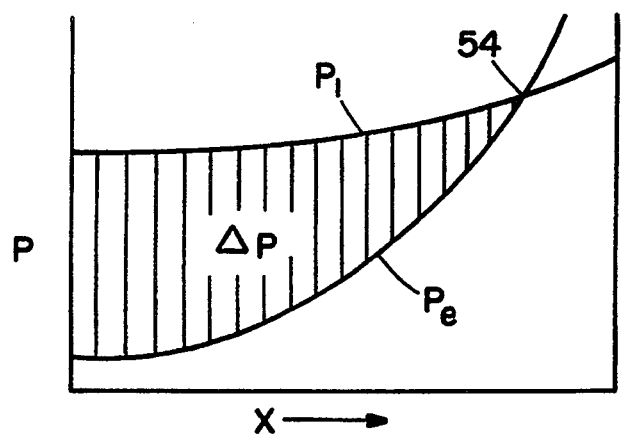
FIG. 4 is a graph depicting the pressure differential between an inlet manifold and an outlet manifold of a typical prior art recuperator.

Without the benefit of the present invention, the situation depicted in FIG. 4 exists wherein the pressure difference ΔP, becomes smaller and smaller with greater distance toward the rear of the engine, as indicated by X on the abscissa. Indeed, a point 54 may be undesirably reached at which $P_i$ through the manifold assembly 24 is impeded.

Figure 5:
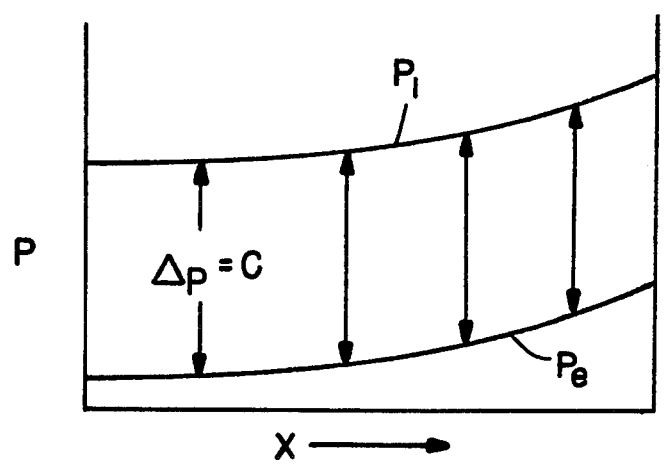
FIG. 5 is a graph depicting the pressure differential between the inlet conduit and the outlet conduit of a recuperator modified in accordance with the invention.

In order to obtain a uniform air distribution within the manifold assembly 24, it is proposed by this invention to provide compensating members or inserts in the manifold with a generally triangular cross section as defined by the inlet openings 32. The desirable result of the invention is depicted by the graph in FIG. 5.

There exist references in the literature which discuss problems arising from unequal pressure distributions in gas turbine engine recuperators. Typical of the prior art in this regard are the following technical papers:

London, A. L. et al., "Oblique Flow Headers for Heat Exchangers", Transactions of the ASME, Journal of Engineering for Power, July, 1968, pp. 271–284; and Perlmutter, Morris, "Inlet and Exit-Header Shapes for Uniform Flow Through a Resistance Parallel to the Main Stream", Transactions of the ASME, Journal of Basic Engineering, September, 1961, pp. 361–368.

These papers limit their focus to rectangular shaped manifolds of constant dimensions and also ignore the effects of air density. In modern gas turbine engines, however, manifolds are of complex geometry and air density variations are considerable and must be taken into account.

Taking these factors into account, it has been determined that the criterion of constant pressure drop will be met if the areas of the inlet and outlet headers are related by the equation:

$$A_i/A_e = [\rho_e/(2\rho_i)]^{\frac{1}{2}}$$

where:
 $A_i$ = cross sectional area of the first conduit at the recuperator inlet (passage 33, FIG. 3);
 $A_e$ = cross sectional area of the second conduit at the recuperator exit (passage 34);
 $\rho_i$ = air density in the first conduit; and
 $\rho_e$ = air density in the second conduit;

For the conditions of operation of the AGT 1500 gas turbine engine, the equation recited above requires $A_i/A_e = 0.658$ while the present ratio of inlet to outlet header areas without utilizing the invention is approximately 0.9.

Figure 6:
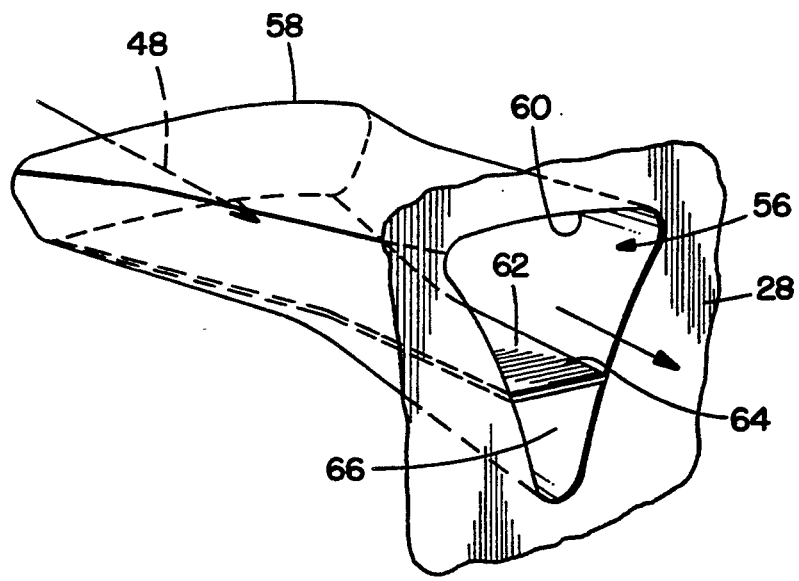
FIG. 6 is a detailed perspective view illustrating the entry passage of a forward header modified in accordance with the present invention.

As seen in FIG. 1, the forward header 28 has an entry passage 56 which extends from each conduit 40 to a first inlet opening 32 adjacent the manifold assembly 24. The inlet passage 56 is more clearly illustrated in FIG. 6 where it is seen to stretch between an inlet 58 and an outlet 60, the inlet 58 between an inlet 58 and an outlet 60, the inlet 58 and the outlet 60 being of substantially different shapes to accommodate placement on the engine 20 of the various components of the engine. For example, the inlet 58 is illustrated in FIG. 6 as being of a somewhat flattened segmental shape while that of the outlet 60 is congruent with the inlet openings 32 against which it is proximately positioned and with which it communicates.

In order to satisfy the mathematical relationship above, it is necessary for the area of the recuperator inlet 60 (FIG. 6) to be 0.658 times the area of the outlet 34 for the specific engine mentioned above. In order to assure that this in fact occurs, it is proposed by the invention to modify an existing engine design. In a first instance, this would be achieved by placing an insert 62 into the transition zone defined by the entry passage 56. The insert 62 may be, for example, a plate properly sized and shaped to assure the desired size relationship between the modified outlet 60 and the inlet 58. The insert 62 may be made out of sheet metal or of some other material of a suitable composition capable of withstanding the temperature, approximately 1200° F., of the exhaust gases flowing through the engine 20. Along its edges 64, the insert 62 is suitably fixed to the header 28, as by welding or other appropriate means of connection. In this manner, a lower region 66 of the original entry passage 56 through the header 28 is rendered inactive. The wall thickness of the insert 62 should be sufficient to withstand the pressure exerted by the air flow and to minimize the relative movement between the insert and the entry passage 56 caused by thermal expansion. Cold air leaving the compressor, advancing via conduits 40 and entering the forward header 28 via the inlet 58 is caused to transit smoothly toward the modified outlet 60 where the flow area is preferably reduced to 2.8 in². In this manner, the optimum ratio between the inlet to the core and the exit from the core is obtained.

Figure 7:
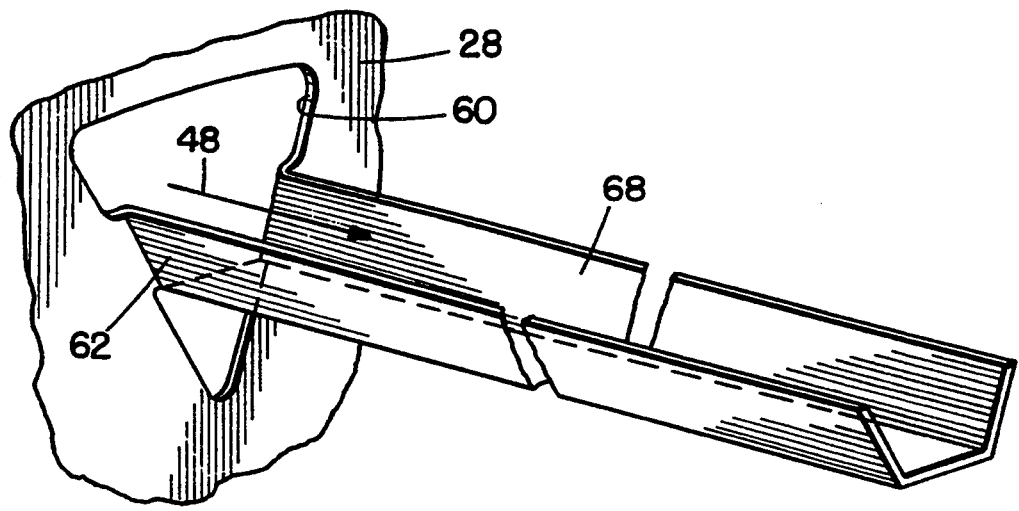
FIGS. 7 and 8 are detailed perspective views, respectfully, of two different embodiments of inserts provided, in accordance with the invention, in a manifold assembly for a gas turbine engine.

Continuing with the modification of the existing engine design, a second insert is similarly provided in the inlet manifold 33 defined by the inlet openings 32 of the plurality of annular disks 26. In one instance, as depicted in FIG. 7, an insert sleeve or trough 68 is suitably mounted, as by welding, to each of the disks 26 at the inlet openings 32. A forwardmost end of the insert trough 68 is suitably fixed to the header 28 at the modified outlet 60 therefrom and a rearwardmost end of the insert trough is suitably fixed to the rear header 30.

Figure 8:
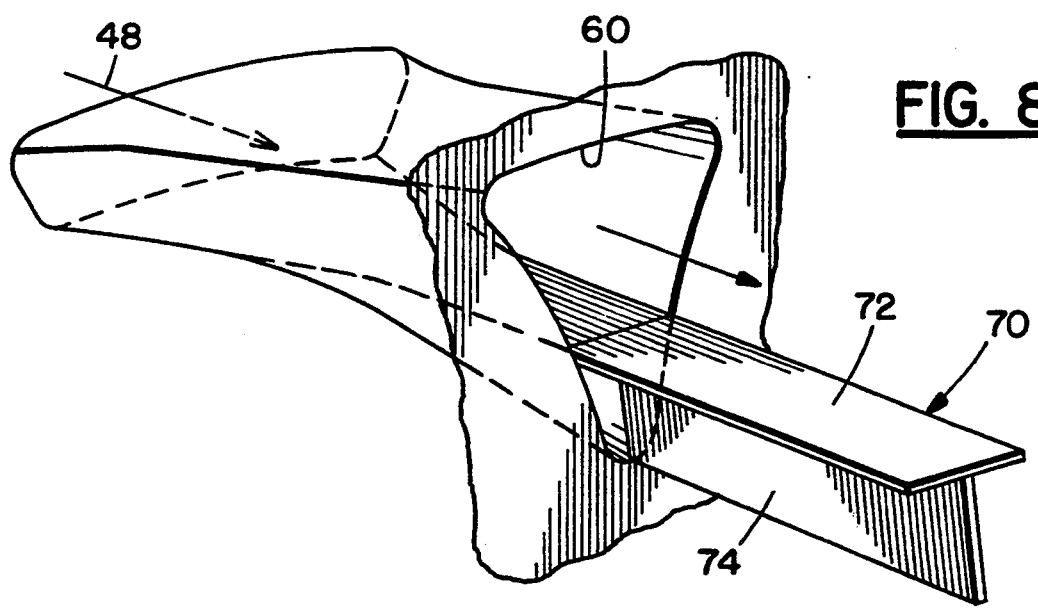

In an alternative construction as illustrated in FIG. 8, an insert 70 may be of a T-shaped design including a flat plate 72 and a perpendicular web 74 extending from the underside of the flat plate to a lowermost surface 76 (FIG. 2) of each of the inlet openings 32. In this manner, the web 74 provides adequate support for the flat plate 72.

By reason of the invention, optimum performance can be readily obtained from an existing design at a minimum of expense and effort. While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A recuperator system for preheating air before it enters the combustion chamber of a gas turbine engine comprising:
 a manifold assembly adjacent the power turbine extending between a forward end and a rear end and having a central passage extending between said forward end and said rear end and a plurality of cross passages communicating with said central passage for containing and guiding flow of exhaust gases from the engine through said assembly, then exhausting it from said assembly;
 said manifold assembly including:
  a plurality of annular disks in side-by-side relationship, each of said disks having a plurality of first openings at successively spaced circumferential locations, each of said disks having a plurality of second openings at successively spaced circumferential locations respectively intermediate the first openings;

the first openings of said plurality of disks at each circumferential location being aligned along the length of said recuperator to define at least a first conduit extending along the length of said assembly for receiving and guiding the flow of cold air to be heated;

the second openings of said plurality of disks at each circumferential location being aligned along the length of said recuperator to define at least a second conduit extending along the length of said assembly for receiving and guiding the flow of pre-heated air toward the combustion chamber of the engine;

said first and second conduits being substantially parallel;

a forward header for supporting said manifold assembly at said forward end; and a rear header for supporting said manifold assembly at said rear end;

said forward header having an entry passage for receiving ambient air and delivering it to said first conduit;

a plurality of cross conduits for connecting said first and second conduits at a plurality of locations along the length of said assembly, said cross conduits being proximate to the cross passages whereby, by means of convection, the cold air from said first conduit becomes pre-heated by the exhaust gases as it flows toward said second conduit;

said annular disks being formed such that, when contiguously positioned, each adjacent pair of said disks defines therebetween the plurality of said cross conduits and the plurality of said cross passages; and compensating means for maintaining substantially constant the pressure differential between said first and second conduits at all locations along the length of said assembly, said compensating means including:

first insert means for placement in said first conduit; and second insert means for placement in said entry passage of said forward header;

whereby the ratio of the cross sectional areas of said first and second conduits conforms to the following relationship:

$$A_i/A_e = [\rho_e/(2\rho_i)]^{\frac{1}{2}}$$

where:
$A_i$ = cross sectional area of the first conduit;
$A_e$ = cross sectional area of the second conduit;
$\rho_i$ = air density in the first conduit; and
$\rho_e$ = air density in the second conduit;
to thereby maintain substantially constant the pressure differential between said first and second conduits along the length of said recuperator.

2. A system for preheating air as set forth in claim 1 wherein said first and second insert means are comprised of sheet metal.

3. In an existing recuperator system for preheating air before it enters the combustion chamber of a gas turbine engine including a manifold assembly extending between a forward end and a rear end and having a central passage extending between said forward end and said rear end and a plurality of cross passages communicating with said central passage for containing and guiding flow of exhaust gases from the engine through said manifold assembly, then exhausting it from said manifold assembly, said manifold assembly including a plurality of annular disks in side-by-side relationship, each of said disks having a plurality of first openings at successive spaced circumferential locations, each of said disks having a plurality of second openings at successive spaced circumferential locations respectively intermediate the first openings, the first openings of said plurality of disks at each circumferential location being aligned along the length of said recuperator to thereby define at least a first conduit extending along its length for receiving and guiding the flow of cold air to be heated, the second openings of said plurality of disks at each circumferential location being aligned along the length of said recuperator to thereby define at least one second conduit extending along the length of said manifold assembly for receiving and guiding the flow of pre-heated air toward the combustion chamber of the engine, said first and second conduits being substantially parallel, and a plurality of cross conduits for connecting the first and second conduits at a plurality of locations along the length of said manifold assembly, said cross conduits being proximate to said cross passages whereby, by means of conduction, the cold air from said first conduit becomes pre-heated by the exhaust gases as it flows toward the second conduit, said annular disks being formed such that, when contiguously positioned, each adjacent pair of said disks defines therebetween said plurality of cross conduits and said plurality of cross passages, a rear header for supporting said manifold assembly at said rear end, a forward header for supporting said manifold assembly at said forward end, said forward header having an entry passage for receiving air from the compressor to the gas turbine engine and delivering it to said first conduit, the improvement comprising:

first insert means for placement in said first conduit for maintaining substantially constant the pressure differential between said first and second conduits along the length of said recuperator, said first insert means including a sleeve fixed to said plurality of disks within and along said first conduit for restricting the flow of air therein; and second insert means for placement in the entry passage for maintaining the cross sectional area of the entry passage substantially constant and substantially equal to that of said first conduit.

4. A system for preheating air as set forth in claim 3 wherein placement of said first and second insert means assures that the ratio of the cross sectional areas of the first and second conduits conform to the following relationship:

$$A_i/A_e = [\rho_e/(2\rho_i)]^{\frac{1}{2}}$$

where:
$A_i$ = cross sectional area of said first conduit;
$A_e$ = cross sectional area of said second conduit;
$\rho_i$ = air density in said first conduit; and
$\rho_e$ = air density in said second conduit;

to maintain substantially constant the pressure differential between said first and second conduits along the length of said manifold assembly.

5. A system for preheating air as set forth in claim 3 wherein the entry passage in said forward header is defined by a continuous wall which extends from an inlet through a transition zone to an outlet adjacent said recuperator, the outlet being initially of greater cross section than the inlet; and wherein said second insert means includes a plate mounted to said wall in the transition zone and extending to the outlet whereby the ratio of the cross sectional areas of said first and second conduits conforms to the following relationship:

$$A_i/A_e = [\rho_e/(2\rho_i)]^{\frac{1}{2}}$$

where:
$A_i$ = cross sectional area of the first conduit;
$A_e$ = cross sectional area of the second conduit;
$\rho_i$ = air density in the first conduit; and
$\rho_e$ = air density in the second conduit;
to thereby maintain substantially constant the pressure differential between said first and second conduits along the length of said recuperator.

6. A system for preheating air as set forth in claim 3 wherein said first and second insert means are comprised of sheet metal.

* * * * *